No. 843,699. PATENTED FEB. 12, 1907.
A. J. H. REID.
CORN AND COTTON PLANTER.
APPLICATION FILED JULY 23, 1906.

2 SHEETS—SHEET 1.

WITNESSES: Alfred. J. H. Reid, INVENTOR.

By C. A. Snow & Co.
ATTORNEYS

THE NORRIS PETERS CO., WASHINGTON, D. C.

No. 843,699. PATENTED FEB. 12, 1907.
A. J. H. REID.
CORN AND COTTON PLANTER.
APPLICATION FILED JULY 23, 1906.
2 SHEETS—SHEET 2.
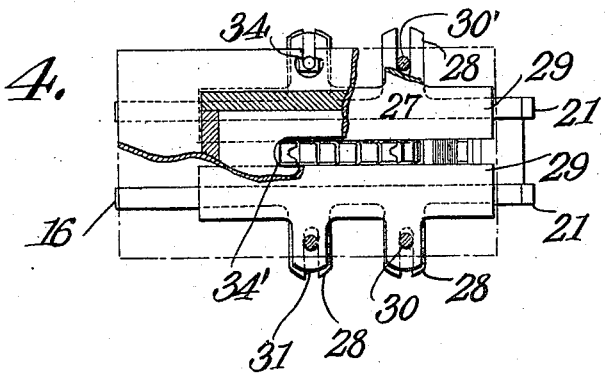
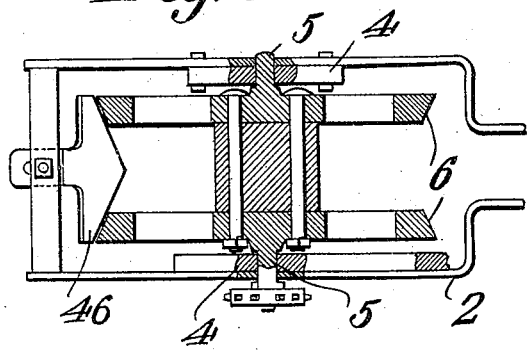
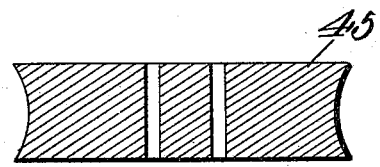
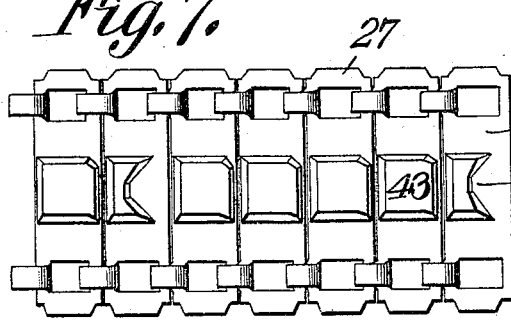
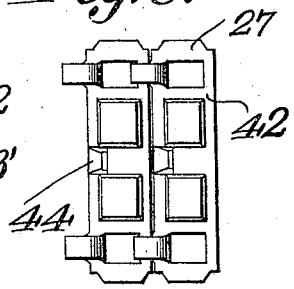
WITNESSES: Alfred. J. H. Reid, INVENTOR.
By C. A. Snow & Co
ATTORNEYS

UNITED STATES PATENT OFFICE.

ALFRED JERE HORN REID, OF HENDERSON, TENNESSEE.

CORN AND COTTON PLANTER.

No. 843,699.  Specification of Letters Patent.  Patented Feb. 12, 1907.

Application filed July 23, 1906. Serial No. 327,385.

*To all whom it may concern:*

Be it known that I, ALFRED JERE HORN REID, a citizen of the United States, residing at Henderson, Tennessee, in the county of Chester and State of Tennessee, have invented a new and useful Corn and Cotton Planter, of which the following is a specification.

This invention has relation to corn and cotton planters; and it consists in the novel construction and arrangement of its parts, as hereinafter shown and described.

The object of the invention is to provide a planter adapted to be used for planting either corn or cotton.

The planter consists of the special arrangement of its parts by which cotton or corn is properly deposited in the ground and covered.

Figure 1:
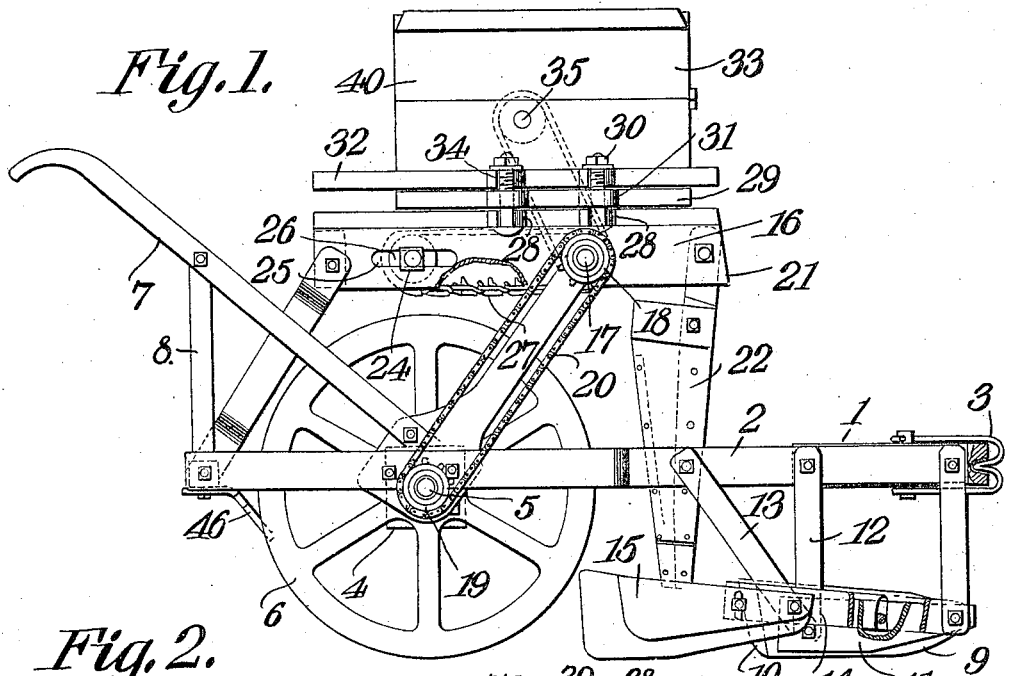
Figure 2:
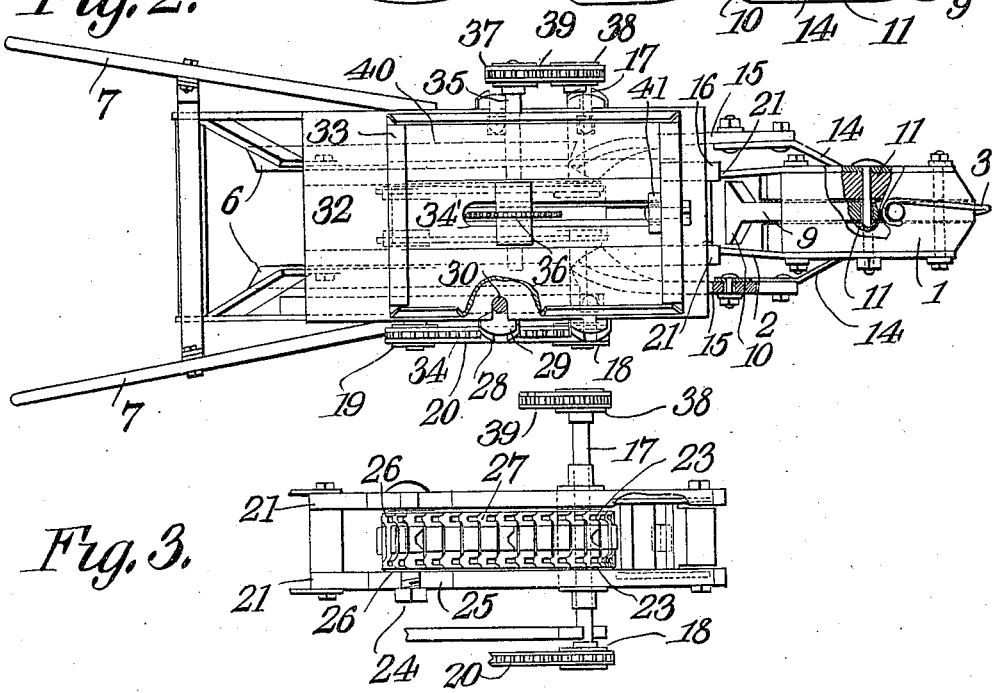
Figure 3:
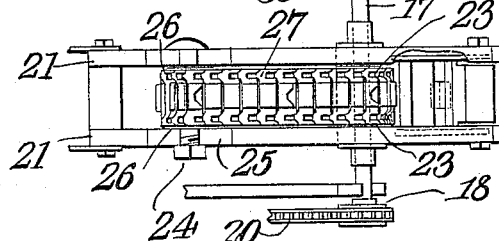

In the accompanying drawings, Figure 1 is a side elevation of the planter with parts broken away. Fig. 2 is a top plan view of the planter with parts in section. Fig. 3 is a top plan view of the seed-dropping belt. Fig. 4 is a plan view of the hopper-valves with parts broken away. Fig. 5 is a horizontal sectional view of the traction-wheel. Fig. 6 is a sectional view of a detached roller. Fig. 7 is a plan view of a portion of one side of the dropping-belt, and Fig. 8 is a plan view of a portion of the opposite side of said belt.

The planter consists of the beam 1, to the sides of which are attached the forward ends of the frame-strips 2. The clevis 3 is attached to the beam 1. The side strips or bars 2 2 are provided with bearings 4 4. The stub-axles 5 are journaled in said bearings 4. The wheel consists of the disks 6 6, spaced apart, and each is provided with a trunnion 5. The peripheries of said disks are chamfered or beveled toward each other. The handles 7 are attached at the lower ends to the strips 2 and are braced by means of the uprights 8, which are attached at their upper ends to the said handles and at their lower ends to the said strips 2.

The furrow-opener 9 is located under the forward end of the beam 1. Said furrow-opener consists of the T-shaped blade or plow 10, which is pivoted at its forward end to the side blocks 11 and which may be adjusted at its rear end between the said blocks—that is to say, the lower edge of the said blade or plow 10 may be projected more or less below the edges of said blocks. The said blocks are attached to the beam 1 by means of the strips or uprights 12.

The braces 13 are attached at their lower ends to the block 11 and at their upper ends to the strips 2. The spring brace-arms 14 are attached at their forward ends to the said blocks 11, and the blades 15 are attached to the rear ends of said arms 14. The coverer-blades 15 are of especial and peculiar construction. The forward portions of the said plates are substantially vertical, and the rear ends of the same at the lower edges are curved inwardly. The lower edges of the said blades are sharpened. The said blades 15 are disposed in front of the disks 6 and are adapted to list the earth into the furrow opened by the plow 10.

The frame 16 is superimposed upon the strips 2. The shaft 17 is journaled in said frame. The sprocket-wheel 18 is attached to said shaft 17, and the sprocket-wheel 19 is attached to the trunnion of one of the disks 6. A sprocket-chain 20 surrounds the sprocket-wheels 18 and 19. The frame 16 consists of two two parallel bars 21 21, which are spaced apart. The upper end of the chute 22 is located between the said bars 21, and the lower end of the said chute is located between the cover-blades 15 15. The said chute 22 is vertically disposed. The sprocket-wheels 23 are located upon the shaft 17 between the bars 21 21. The shaft 24 is located at its ends in the elongated slots 25 25, provided in the bars 21. The wheels 26 are located upon the said shaft 24. A chain or belt 27 of a special construction surrounds the wheels 26 and the sprocket-wheels 23. The slotted ears 28 are attached to the sides of the bars 21. The valves 29 are attached to the ears 28 by means of the bolts 30, which pass through perforations in the lugs 31, attached to the said valves, and through the slots of the ears 28.

The base-plate 32 is attached to and forms the bottom of the hopper 33. The said base-plate is provided in its longitudinal edges with the recesses 34, which are adapted to receive the bolts 30. The said plate 32 is provided along its central longitudinal axis with the elongated opening 34', which serves as an outlet for the hopper 33. The shaft 35 is journaled in the said hopper 33 and is provided with the stirring fingers or arms 36. The sprocket-wheel 37 is fixed to the end of said shaft 35, and the sprocket-wheel 38 is fixed to the end of the shaft 17. The sprocket-chain 39 passes around the sprocket-wheels 37 and 38. The hopper 33 is provided with the converging sides 40 40, and at the forward end of the said hopper, with its lower end located in the opening 34, is a brush 41. The said brush 41 may be adjusted vertically or detached, if desired. The chain that passes around the sprocket-wheels 18 and 26 is of special construction. The links 42 of the said chain are provided on one side with the flat lugs 43, which are adapted to pass between the inner ends of the valves 29. Some of the said lugs 42 are provided with openings 43', which are adapted to receive seed and convey the same from the hopper 23 to the upper end of the chute 22. The brush 41 prevents the escapement of any seed except such as enters the recesses 43', provided in the links of the chain 42. In this manner corn or other substantially smooth seed is dropped from the implement. In the case of cotton, where the seed bears a fiber and has a tendency to cling and pile, the same chain as above described is used; but its links are reversed—that is to say, the under sides of the links are upwardly disposed. The under side of each link 43 is provided with a spur 44, which is adapted to enter the space between the inner edges of the valves 29 29 and which will tear the cotton-seed apart and deposit the separated seed in the upper end of the chute 22.

When the seed is planted, it is desirable in some instances that the row be hilled up and nicely rounded. To accomplish this, the roller 45, having the concaved periphery, is inserted between the disks 6 6. After the seed is deposited and the earth is listed by the plows 15 15 the seed-roller 45 packs the earth down on top of the furrow and forms a well-rounded row. The scraper 46 is located upon the frame of the implement and is adapted to remove mud or dirt from the edge of the roller 45 or from the edges of the wheels 6 6.

Having described my invention, what I claim as new, and desire to secure by Letters Patent, is—

1. An implement such as described consisting of a frame, furrow openers and closures attached to the frame, a wheel supporting the same, a hopper superimposed upon the frame, laterally-adjustable valves attached to the bottom of the hopper and adapted to be moved to form the outlet of the hopper, a reversible belt located below the hopper said belt having upon one of its sides recesses adapted to receive seed and upon its opposite sides spurs adapted to engage the seed and which are adapted to operate between the adjustable valves, a chute located at the end of the hopper and the end of said belt, and means for operating the said belt.

2. An implement such as described consisting of a frame, a wheel supporting the same, a hopper superimposed upon the frame, said hopper having an outlet, a reversible belt located below the hopper, said belt having upon one of its sides recesses adapted to receive seed and upon its opposite side spurs adapted to engage the seed.

In testimony that I claim the foregoing as my own I have hereto affixed my signature in the presence of two witnesses.

ALFRED JERE HORN REID.

Witnesses:
JNO. F. O'NEAL, Jr.,
H. L. GIBSON.